(12) United States Patent
Clarke

(10) Patent No.: US 10,417,041 B2
(45) Date of Patent: Sep. 17, 2019

(54) MOVING A SOFTWARE APPLICATION IN A SYSTEM CLUSTER

(75) Inventor: Michael Paul Clarke, Ellenbrook (AU)

(73) Assignee: International Business Machines Corporation, Armonk, NY (US)

( * ) Notice: Subject to any disclaimer, the term of this patent is extended or adjusted under 35 U.S.C. 154(b) by 2127 days.

(21) Appl. No.: 11/866,906

(22) Filed: Oct. 3, 2007

(65) Prior Publication Data

US 2009/0094608 A1 Apr. 9, 2009

(51) Int. Cl.
*G06F 9/48* (2006.01)

(52) U.S. Cl.
CPC .................. *G06F 9/4856* (2013.01)

(58) Field of Classification Search
CPC .................................... G06F 9/4856
USPC .......................................... 718/104
See application file for complete search history.

(56) References Cited

U.S. PATENT DOCUMENTS

| 7,788,639 | B2 | 8/2010 | Betzler et al. |
| 2005/0071107 | A1 | 3/2005 | Betzler et al. |
| 2005/0091098 | A1 | 4/2005 | Brodersen et al. |
| 2006/0090095 | A1* | 4/2006 | Massa et al. ............ 714/4 |
| 2007/0083588 | A1 | 4/2007 | Keller et al. |
| 2009/0007135 | A1* | 1/2009 | Rathunde et al. ........ 718/107 |

* cited by examiner

*Primary Examiner* — Chat C Do
*Assistant Examiner* — Bradford F Wheaton
(74) *Attorney, Agent, or Firm* — Yee & Associates, P.C.; Alexander Jochym

(57) ABSTRACT

A method, apparatus and program product for shutting down a first instance of an application and starting up a second instance of the application. The first instance of the application has associated therewith at least one first instance support resource. The second instance of the application has associated therewith at least one second-instance support resource. The method includes starting up the at least one second-instance support resource; shutting down the first instance of the application after the at least one second-instance support resource has started up; and starting up the second instance of the application based on at least one condition from a set consisting of: when the at least one second-instance support resource is running, and when the first instance of the application has shut down to a selected degree.

3 Claims, 6 Drawing Sheets

MOVING A SOFTWARE APPLICATION IN A SYSTEM CLUSTER

FIELD OF THE INVENTION

The invention relates to the field of software application availability management and more particularly to moving from one instance of an application in a system cluster to another instance of the application in the system cluster.

BACKGROUND OF THE INVENTION

In some situations when an application is running on a particular system within a system cluster, it is desirable to move the application to another system within the cluster. Moving an application from one system to another entails shutting down the application on the first system and starting it up on the other. Reference is made to FIG. 1, which shows a timing diagram of such an operation as sometimes currently occurs in a software environment. When it is desired for a move to take place, an order is given at time T0 by some form of application availability management software to stop the first instance of the application, shown at 100, that is present on a first system, shown at 102, and at the same time, an order is given to start up a second instance of the application, shown at 104, on the second system, shown at 106. In many situations, the shut down of the first instance of the application 100 takes place relatively quickly. However, prior to the start up of the second instance of the application 104 on the second system 106, some support resources may need to be running on the second system. Support resources are shown in FIG. 1 at 108a, 108b and 108c. In the example, shown in FIG. 1, the support resource 108a needs to be running before support resource 108b can be started up, and the support resource 108b needs to be running before the support resource 108c can be started up. Accordingly, at time T0, the order is given to start up the support resource 108a. Once the support resource 108a is running, at time T1, the start conditions are satisfied for starting up the support resource 104b and so it is started up. Once the support resource 108b is running, at time T2, the start conditions are satisfied for starting up the support resource 104c, and so it is started up. Once the support resource 108c is running, at time T3, the start conditions are satisfied for starting up the second instance of the application 102. After a start-up period, the second instance of the application 102 is itself running, at time T4.

The total time period during which the application is inaccessible was T4 minus T0, which is shown in FIG. 1 as TPmove1. The total time period TPmove1 may be inconveniently long for users waiting for the startup of the second instance for the application 104. Additionally, in some situations any of the support resources 108a, 108b and 108c can fail during their start up. This can result, for example, in the need for an alternative supporting application to be started up, or which can result, for example, in the need to start up a third instance of the application on a third system. Thus, the total time period TPmove1, could be significantly longer than that shown in FIG. 1.

As illustrated by the aforementioned scenarios, the application can suffer a significant outage during a move. It would be advantageous to reduce the time that an application is down during a move.

SUMMARY OF THE INVENTION

In a first aspect, the invention is directed to a method for shutting down a first instance of an application and starting up a second instance of the application. The first instance of the application has associated therewith at least one first-instance support resource. The second instance of the application has associated therewith at least one second-instance support resource. The method includes:
starting up the at least one second-instance support resource;
shutting down the first instance of the application after the at least one second-instance support resource has started up; and
starting up the second instance of the application based on at least one condition from a set consisting of: when the second instance of the set of at least one support resource is running, and when the first instance of the application has shut down to a selected degree.

In a second aspect, the invention is directed to a method for shutting down a first instance of an application and starting up a second instance of the application. The method includes:
starting up the second instance of the application; and
shutting down the first instance of the application after the second instance of the application has started.

In another aspect, the invention is directed to an apparatus configured to carry out at least one of the above-described methods.

In yet another aspect, the invention is directed to a computer program product comprising at least one computer usable medium including computer-usable program code for carrying out at least one of the above-described methods.

BRIEF DESCRIPTION OF THE DRAWINGS

For a better understanding of the present invention, and to show more clearly how it may be carried into effect, reference will now be made, by way of example, to the accompanying drawings in which.

DETAILED DESCRIPTION OF THE INVENTION

Figure 2:
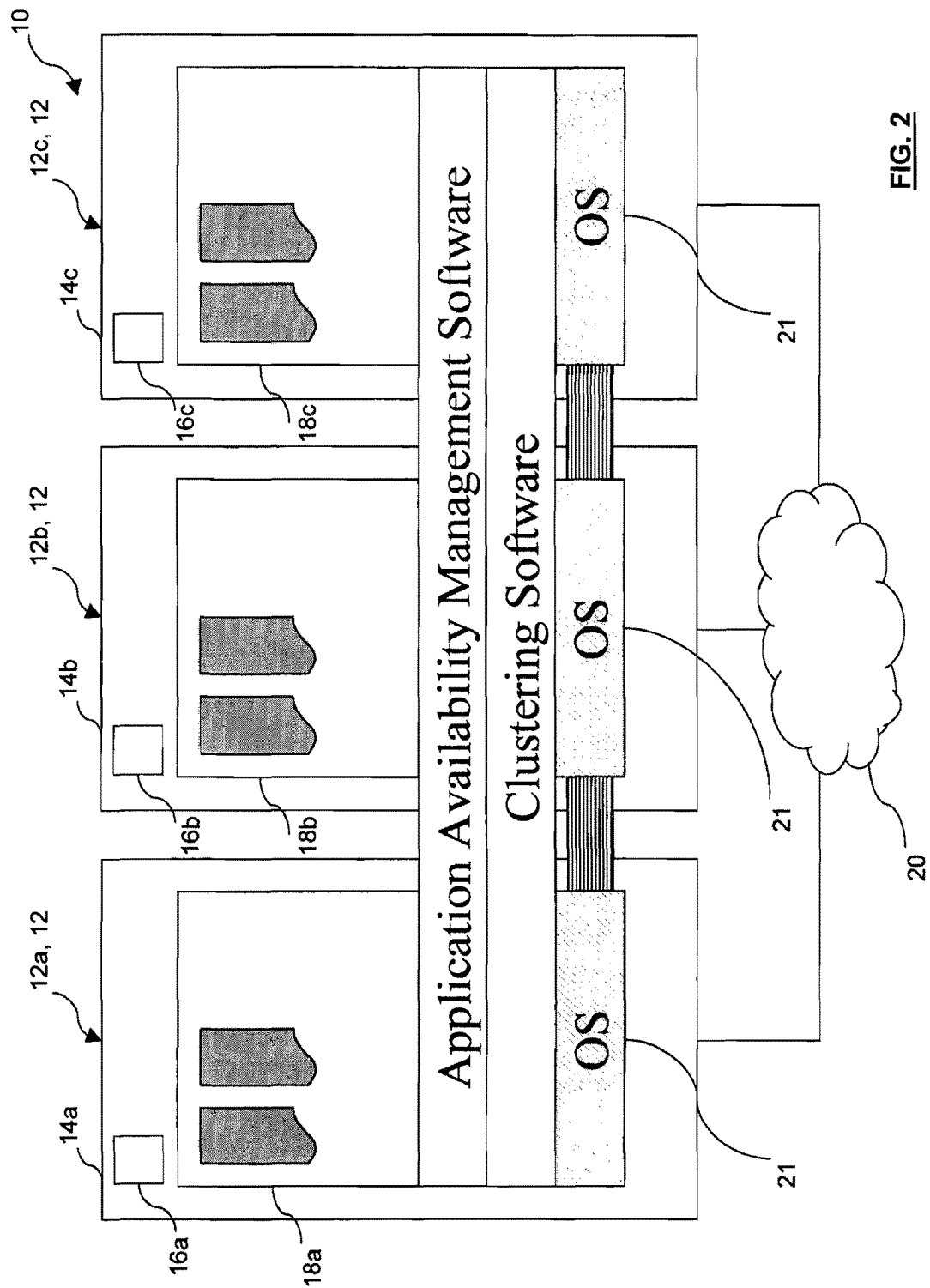
FIG. 2 is a pictorial representation of a system cluster in which computer program code may be implemented for carrying out a move of a software application from one system to another system in the system cluster in accordance with an embodiment of the present invention.

Reference is made to FIG. 2, which illustrates a system cluster 10, which is a user-defined grouping of three systems 12, shown individually at 12a, 12b and 12c. It will be understood that the system cluster 10 could alternatively be made up of any suitable number of systems 12, such as two systems 12 up to hundreds or even thousands of systems, for example. It is possible for a system cluster to contain as few as one system.

Each system 12 may be provided with a separate machine (eg. computer). For example, as shown in FIG. 2, the systems 12a, 12b and 12c may include separate machines 14a, 14b and 14c respectively, having processors 16a, 16b and 16c respectively and having computer readable memory 18a, 18b and 18c respectively that is accessible as necessary by the processors 16a, 16b and 16c respectively. The systems 12a, 12b and 12c are connected together an interconnection 20, which may be any suitable type of interconnection such as a private network or a public network.

Each system 12 has an operating system 21, which may be, for example, a z/OS™ operating system.

Figure 3:
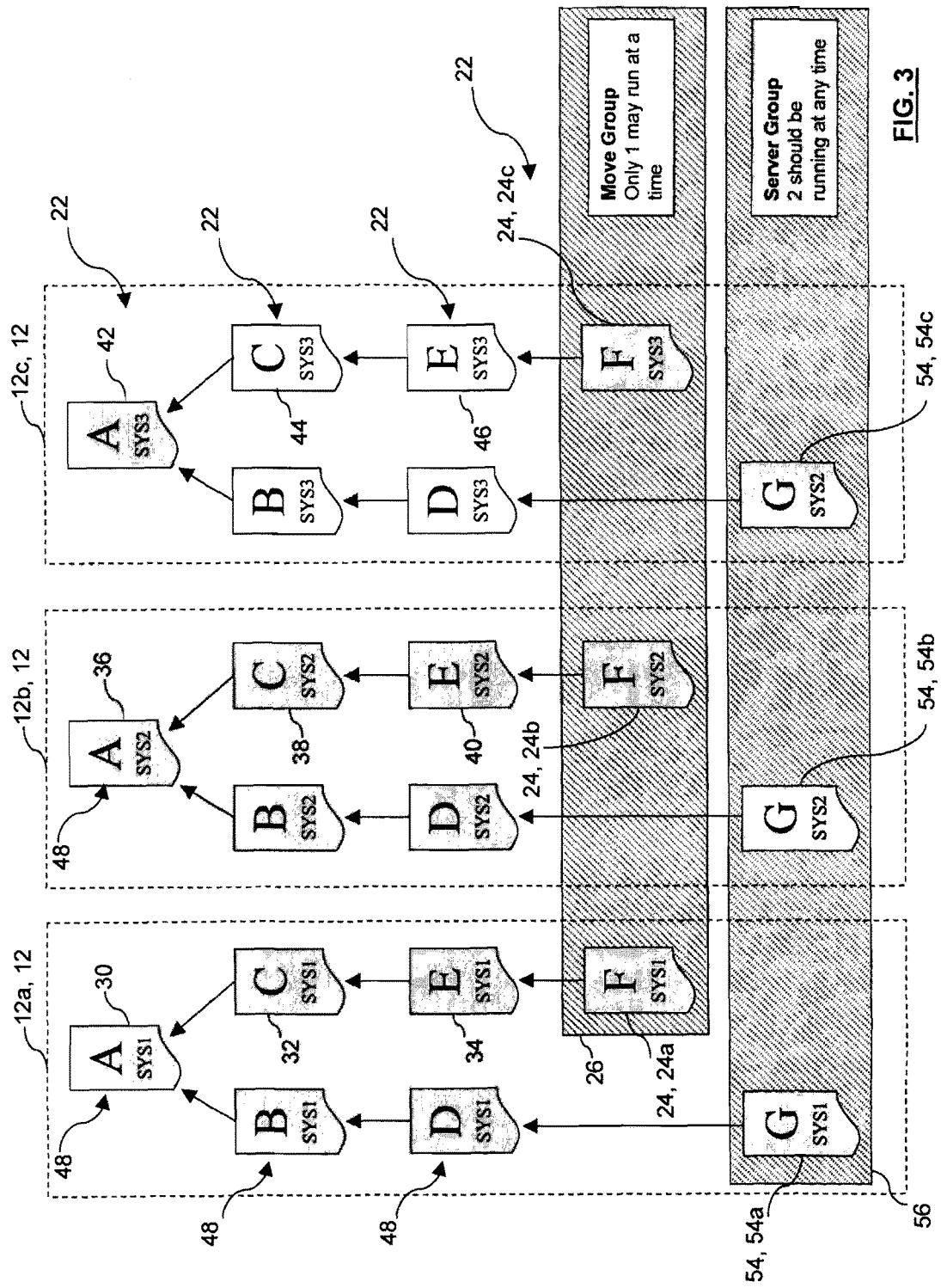
FIG. 3 is a pictorial representation of selected software applications on the system cluster shown in FIG. 2, illustrating a set of dependencies and rules that apply to the software applications.

Reference is made to FIG. 3, which shows selected software applications 22 that are provided on each of the systems 12a, 12b and 12c. A selected application, shown at 24, may be categorized as requiring high availability. As a result of this categorization, an instance of the application would be provided on each system 12. The instances of the application 24 are shown individually at 24a, 24b and 24c respectively.

In the example shown in FIG. 2, only one instance 24a, 24b or 24c of the application 24 is permitted to be running at a time in the system cluster 10. When only one instance of an application may be running in a system cluster at any one time, the group consisting of the instances of the application may be referred to as a move group. The move group consisting of the instances 24a, 24b and 24c of the application 24 is shown at 26. One of the instances 24a, 24b or 24c of the application 24 may be the one that is selected to normally be running.

Each instance 24a, 24b and 24c of the application 24 may depend on one or more support resources in order to run on its associated system 12a, 12b or 12c. For example, the first instance 24a of the application 24 may require three first-instance support resources 30, 32 and 34 on the first system 12a in order to run, which may also be referred to as the first first-instance support resource 30, the second first-instance support resource 32 and the third first-instance support resource 34. The second instance 24b of the application 24 may require first, second and third second-instance support resources 36, 38 and 40 on the second system 12b in order to run. The third instance 24c of the application 24 may require first, second and third third-instance support resources 42, 44 and 46 on the third system 12c in order to run. The support resources may generally be referred to at 48. The support resources 48 may be separate, independent programs from one another in the sense that there may be no rules held by the managing software for the system cluster 10 governing how many support resources 48 can or should be running at a given time. There may, however, be dependencies relating to the support resources 48 however. For example, the third support resource 40 may require the second support resource 38 to be running in order to run. Similarly, the second support resource 38 may itself require the first support resource 36 to be running in order to run.

Under certain circumstances it may be necessary to shut down the first instance of the application 24a on the first system 12a and start it up on one of the other systems 12, such as the second system 12b. This action may be referred to as a move. The need to shut down the first instance 24a of the application 24 may arise for many different reasons, such as, for example, a need to conduct maintenance on the first system 12a.

Figure 1:
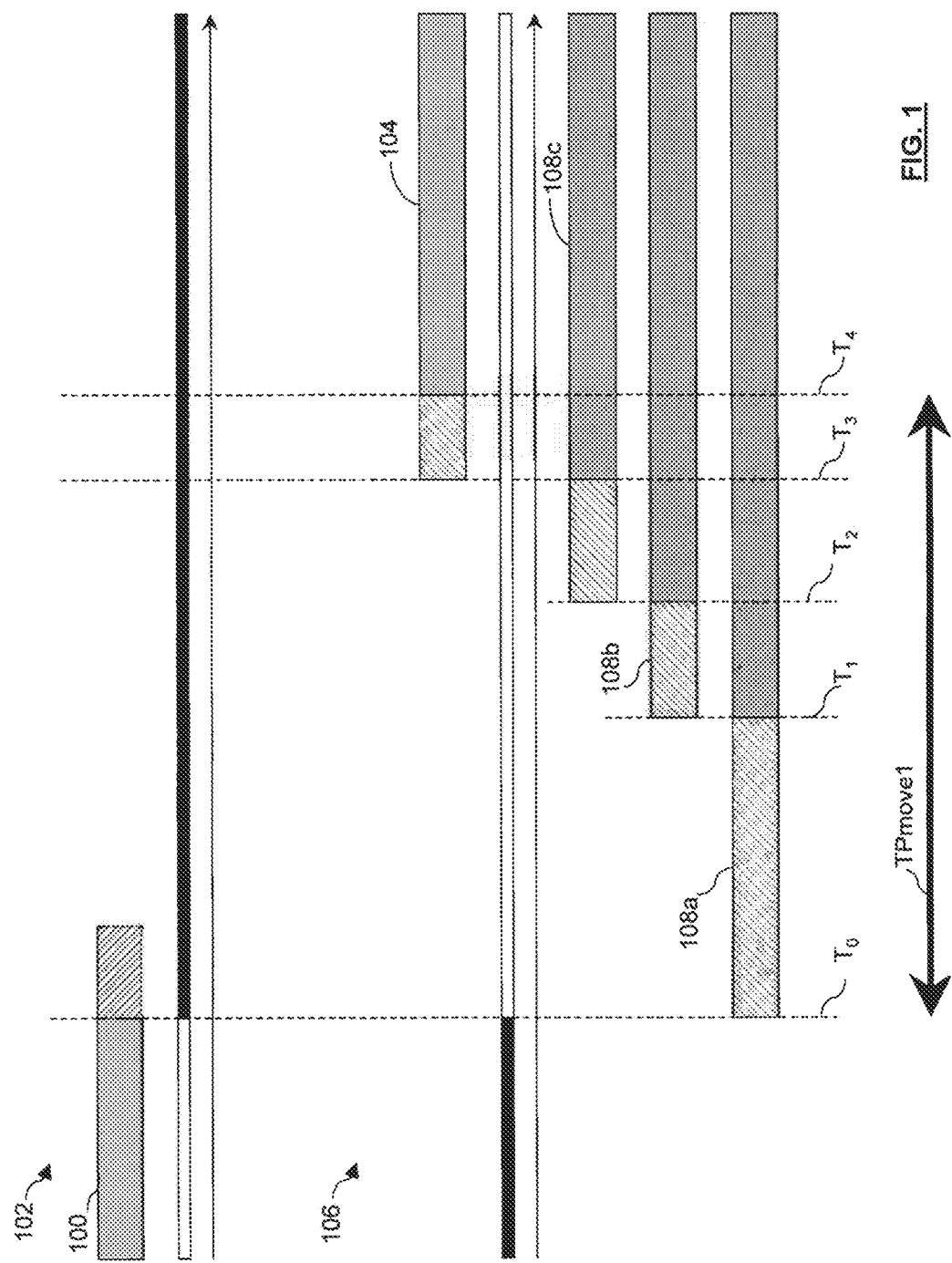
FIG. 1 is a pictorial representation of a move of a software application from one system to another system in a system cluster in accordance with the prior art.
Figure 4:
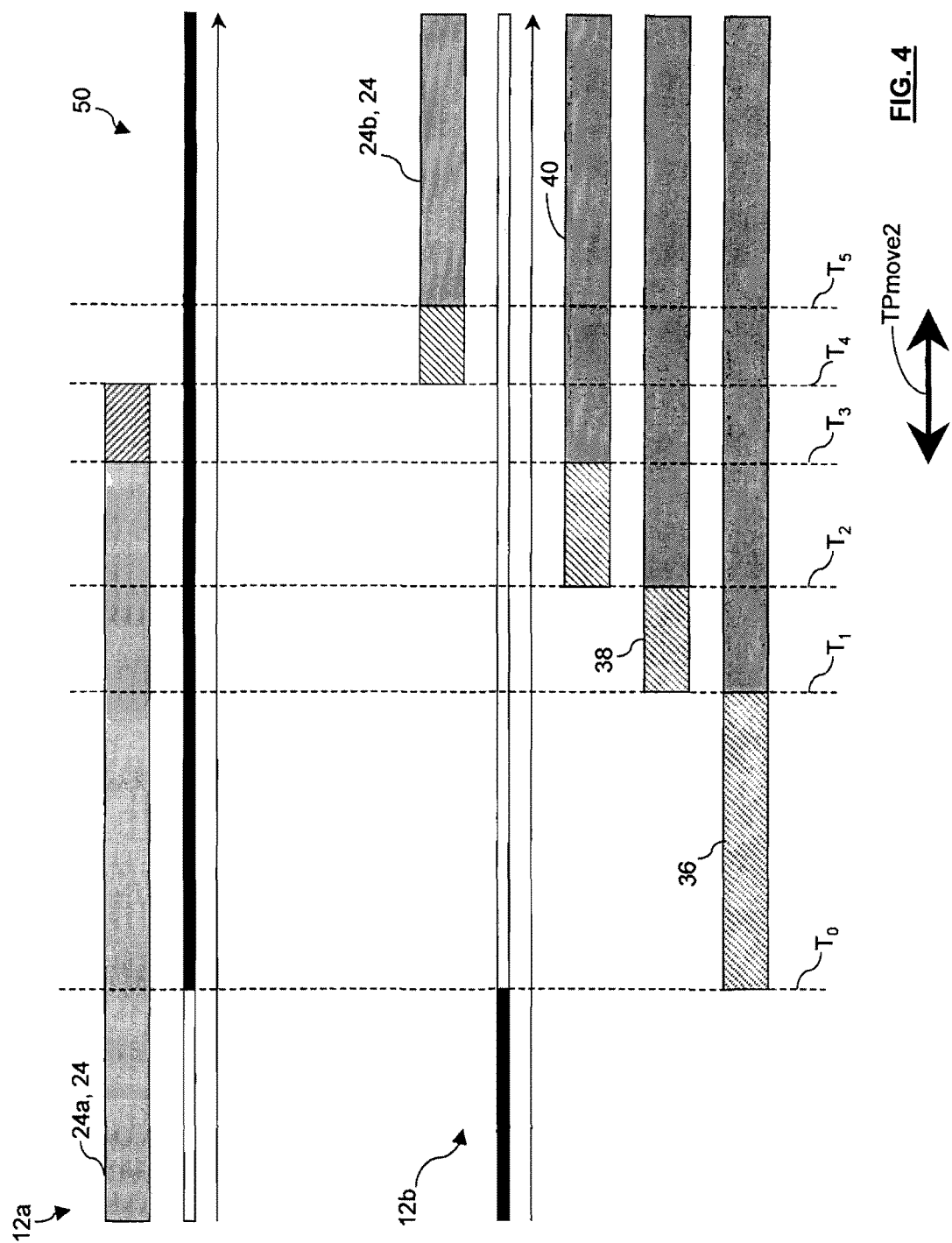
FIG. 4 is a pictorial representation of a move of a software application from one system to another system in a system cluster in accordance with an embodiment of the present invention.

Reference is made to FIG. 4, which is a time chart illustrating a method 50 by which a move may take place in accordance with an embodiment of the present invention. Initially, the first instance 24a of the application 24 is operating on the first system 12a. At a point in time T0, an order is given to move the running of the application 24 from the first system 12a to the second system 12b. In order to reduce the time period during which the application 24 is unavailable, however, the first instance 24a of the application 24 is not shut down at time T0. Instead, the first support resource 36 is started up on the second system 12b. Once the first support resource 36 is running, at time T1, the second support resource 38, which depends thereon, is started up on the second system 12b. Once the second support resource 38 is running, at time T2, the third support resource 40 is started up on the second system 12b. Once the third support resource 40 is running, at time T3, the first instance 24a of the application 24 on the first system 12a is shut down. At time T4 the shut down of the first instance 24a of the application 24 is complete. At this point, the second instance 24b of the application 24 is started up on the second system 12b. At time T5, the second instance 24b of the application 24 is running. Thus, the time period wherein the application 24 was unavailable is the time T5 minus the time T3, and is shown at TPmove2. The time period TPmove2 may be essentially equal to the time period required to shut down the first instance 24a of the application 24, plus the time period required to start up the second instance 24b of the application 24, barring unexpected events such as a system or program crash. As can be seen, the time period TPmove2 is less than the time period TPmove1, shown in FIG. 1, because, in the embodiment shown in FIG. 4 the support resources 36, 38 and 40 are already up and running on the second system 12b prior to the shut down of the first instance 24a of the application 24. The move illustrated in FIG. 4 may be referred to as a serial move, because the second instance 24b of the application 24 is started up only after the first instance 24a of the application is completely shut down.

Figure 5:
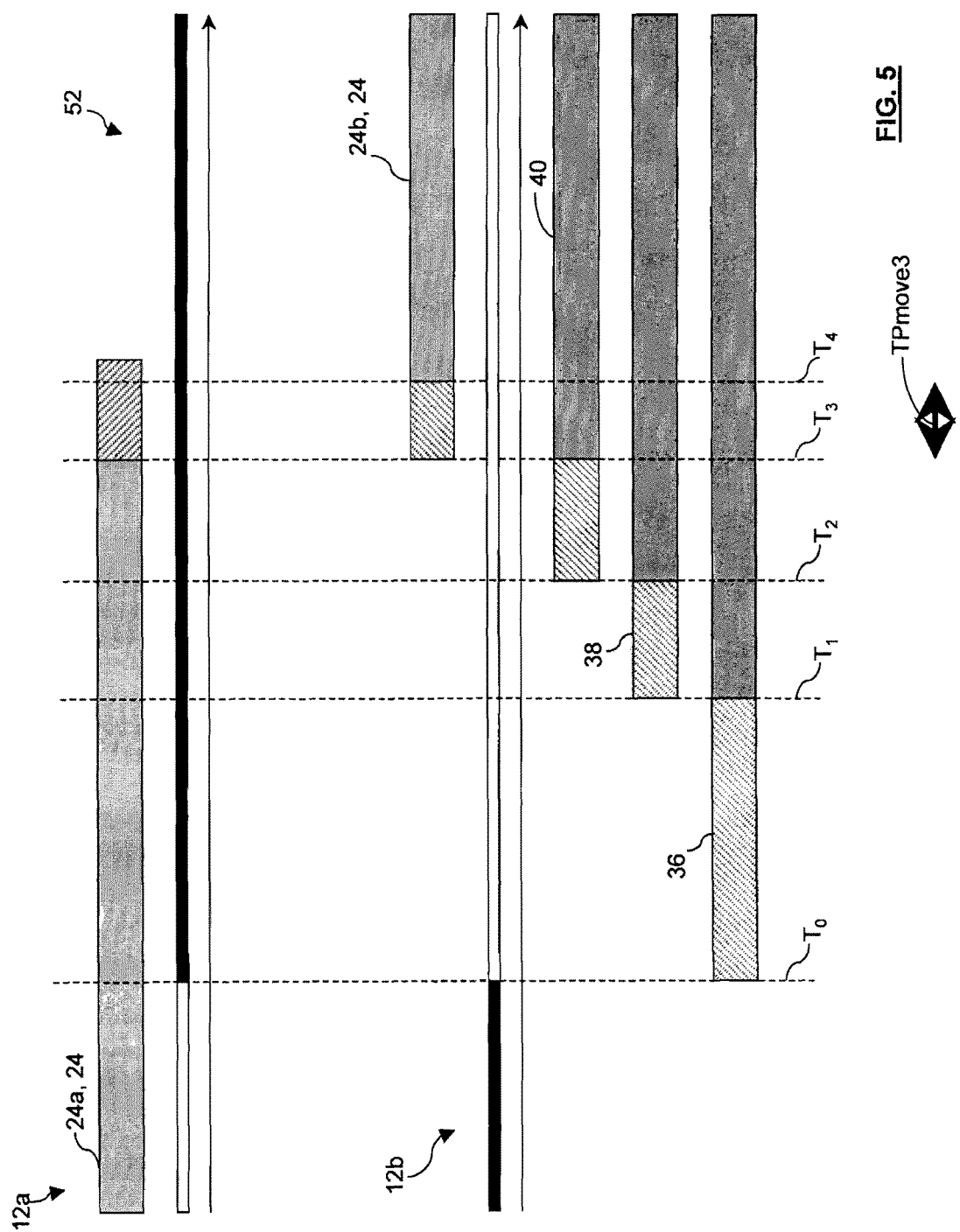
FIG. 5 a pictorial representation of a move of a software application from one system to another system in a system cluster in accordance with another embodiment of the present invention.

Reference is made to FIG. 5, which illustrates a method 52 by which a 'parallel' move of the first instance 24a of the application 24 from the first system 12a to the second system 12b may be carried out, in accordance with another embodiment of the present invention. The initial steps of the method 52 are similar to those of the method 50 shown in FIG. 4. At time T0, the order to carry out the move is given. At that time, the first support resource 36 is started up on the second system 12b. At time T1, when the first support resource 36 is running, the second support resource 38 is started up. At time T2, when the second support resource 38 is running, the third support resource 40 is started up. At time T3, the method 52 differs from the method 50 shown in FIG. 4. At time T3, the first instance 24a of the application 24 is shut down, and the second instance 24b of the application 24 is started up. Thus, there is overlap in the shut down of the first instance 24a of the application and the start up of the second instance 24b of the application 24. These two actions need not take the same period of time to be completed. The time at which the second instance 24b of the application is running is shown at T4. The time period during which the application 24 is unavailable is shown at TPmove3, and is shorter than the time period TPmove2 shown in FIG. 4. The time period TPmove3 is approximately equal to the time period required to start up the second instance 24b of the application 24, and is thus equal to the time T4 minus the time T3.

It will be understood that some applications may require a serial move as shown in FIG. 4, while others can permit a parallel move. The type of move that is permitted is at least somewhat dictated by the nature of the application 24 itself.

Reference is made to FIG. 2, wherein another type of grouping of applications is illustrated, in addition to the move group discussed above. Some applications, such as the application 54 are not required to only have a single instance running at any one time in the system cluster 10. The application 54 may, for example, have a target of two instances running on two of the systems 12. For example, the managing software of the system cluster 10 may default to having a first instance 54a of the application 54 and a second instance 54b of the application 54 running at the same time, on the first and second systems 12a and 12b respectively. In the event that the application 54 is considered to require high availability, the first and second instances 54a and 54b of the application 54, and the third instance, shown at 54c, of the application 54 may be organized into a grouping referred to as a server group 56. The term 'server group' applies to groups of instances of applications, wherein it is necessary or desired to have a selected number (that is two or greater) of the instances running on their respective systems 12 at any given time. For a server group, such as the server group 56, it may be acceptable to have more than the target number of instances of the application running at any given moment.

Figure 6:
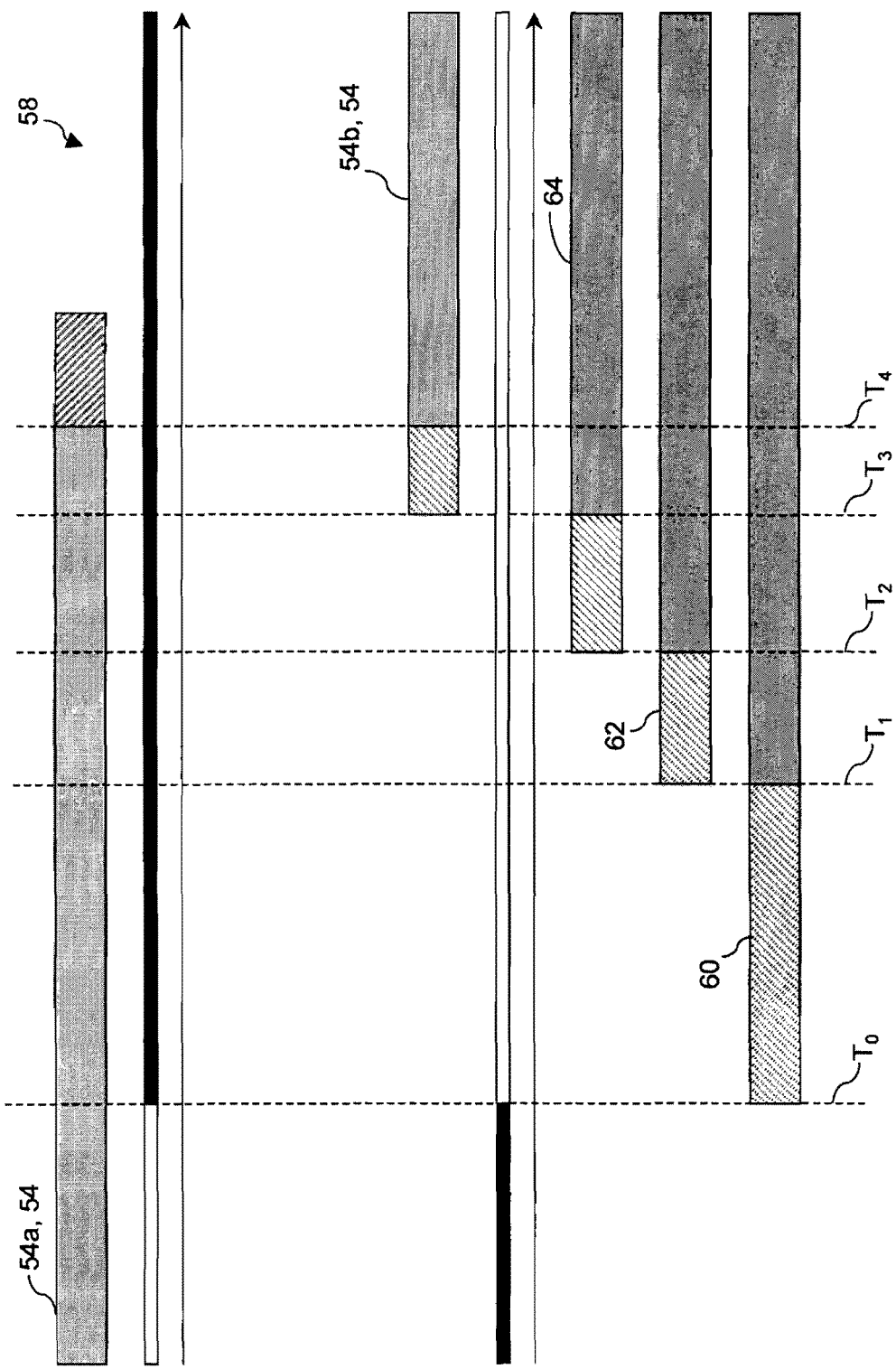
FIG. 6 is a pictorial representation of a move of a software application from one system to another system in a system cluster in accordance with yet another embodiment of the present invention.

Reference is now made to FIG. 6, which illustrates a method 58 of carrying out a move for the first instance 54a of the application 54. Similarly to the method 52 shown in FIG. 5, the method 58 is initiated at time T0 with an order to carry out the move. At time T0, the first support resource, shown at 60, is started up. At time T1, the second support resource, which is shown at 62 and which is dependent on the first support resource 60, is started up. At time T2, the third support resource, which is shown at 64 and which is dependent on the second support resource 62, is started up. When the third support resource 64 is running, at time T3, the method 58 differs from the method 52 shown in FIG. 5. At time T3, the second instance 54b of the application 54, which is dependent on all the support resources 60, 62 and 64 is started up. The first instance 54a of the application 54 is, however, not shut down prior to the start up of the second instance 54b. At time T4, the second instance 54b of the application is running. Thus, at time T4, the first instance 54a of the application 54 is shut down. It will be noted that there is no time period of unavailability for the application 54 when using the method 58.

With respect to the method 58 shown in FIG. 6, it is alternatively possible for there to be no support resources required for the start up of the second instance 54b of the application 54. If that is the case, then the method 58 would entail simply the start up of the second instance 54b of the application 54, and the shut down of the first instance 54a of the application 54 after the second instance 54b is running, thereby eliminating any time period during which the application 54 is unavailable.

Aside from the reduced time period of unavailability for an application, an advantage of waiting until the second-instance support resources has started up before shutting down the first instance of the application, is that, if the start up of the second instance of the one or more support resources fails for some reason, another attempt can be made on a third system to start up any second-instance support resources, all while the first instance of the application is still running. Thus, any users of the application are not subjected to a long period of unavailability for the application. By contrast, a move in accordance with the prior art sometimes entails an order to shut down the first instance of an application and an essentially simultaneous order to start up the second instance of the application, which entails starting up a one or more second-instance support resources. Starting up the second-instance support resources and then starting up the second instance of the application may take a relatively long time compared to starting up only the second instance of the application itself, and can take significantly longer in the event that there is a failure during the start up of the second-instance support resources.

It is possible for the above-described methods to be carried out manually (ie. for a user to manually start up and shut down applications based on a set of conditions in accordance with the methods described above). It is also possible, and advantageous for the methods described herein to be carried out by automated means, such as by software. It is also possible for the methods described herein to be carried out by a combination of manual and automated means. It is possible for the above-described method to be carried out using a computer program product comprising at least one computer usable medium including computer-usable program code. It is possible to provide a data processing system comprising at least one processor, at least one computer usable medium coupled to the at least one processor, wherein the at least one computer usable medium contains a set of instructions and wherein the at least one processor is adapted to carry out the set of instructions by causing the data processing system to carry out any of the above-described methods.

In embodiments wherein one or more steps of the methods described herein are carried out using software, the coding of the software is within the skill of a person skilled in the art, after having read the description contained herein.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

An apparatus suitable for storing and/or executing program code will include at least one processor coupled directly or indirectly to memory elements.

Input/output or I/O devices (including but not limited to keyboards, displays, pointing devices, etc.) can be incorporated either directly or through intervening I/O controllers into the apparatus noted above.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

I claim:

1. A method for shutting down execution of a first instance of an application and starting up execution of a second instance of the application, wherein the first instance of the application is an executable software application that has associated therewith at least one first-instance support resource, and the second instance of the application is an executable software application that has associated therewith at least one second-instance support resource that the second instance of the application depends upon in order to run, the method comprising:
responsive to an order to move the first instance of the application from a first system to a second system, starting up the at least one second-instance support resource that the second instance of the application depends upon in order to run;
starting up the second instance of the application after the at least one second-instance support resource is running; and
shutting down the first instance of the application after the second instance of the application is running; and further comprising:
a third instance of the application, wherein the first instance of the application is present on a first system in a system cluster, wherein the second instance of the application is present on a second system in the system cluster, wherein the third instance of the application is present on a third system of the system cluster, and wherein the third instance of the application is running on the third system of the system cluster while the first instance of the application is running on the first system and continues running on the third system after shutting down the first instance of the application responsive to the second instance of the application completing a start up of the second instance of the application.

2. An apparatus configured to manage a shut down of a first instance of an application and a start up of a second instance of the application, wherein the first instance of the application is an executable software application that has associated therewith at least one first-instance support resource, and the second instance of the application is an executable software application that has associated therewith at least one second-instance support resource that the second instance of the application depends upon in order to run, the apparatus comprising:
at least one processor;
at least one computer usable medium coupled to the at least one processor, wherein the at least one computer usable medium contains a set of instructions and wherein the at least one processor is adapted to carry out the set of instructions, wherein the set of instructions includes instructions to:
responsive to an order to move the first instance of the application, start up the at least one second-instance support resource that the second instance of the application depends upon in order to run;
start up the second instance of the application after the at least one second-instance support resource is running; and
shut down the first instance of the application after the second instance of the application is running; and further comprising a third instance of the application, wherein the first instance of the application is present on a first system in a system cluster, wherein the second instance of the application is present on a second system in the system cluster, wherein the third instance of the application is present on a third system of the system cluster, and wherein the third instance of the application is running on the third system of the system cluster while the first instance of the application is running on the first system and continues running on the third system after shutting down the first instance of the application responsive to the second instance of the application completing a start up of the second instance of the application.

3. A computer program product comprising at least one tangible, non-transitory computer usable storage device having stored thereon computer-usable program code for shutting down execution of a first instance of an application and starting up execution of a second instance of the application, wherein the first instance of the application is an executable software application that has associated therewith at least one first-instance support resource, and the second instance of the application is an executable software application that has associated therewith at least one second-instance support resource that the second instance of the application depends upon in order to run, the computer program product comprising:
computer-usable program code, responsive to an order to move the first instance of the application, for starting up the at least one second-instance support resource that the second instance of the application depends upon in order to run;
computer-usable program code for starting up the second instance of the application after the at least one second-instance support resource is running; and
computer-usable program code for shutting down the first instance of the application after the second instance of the application is running; and further comprising a third instance of the application, wherein the first instance of the application is present on a first system in a system cluster, wherein the second instance of the application is present on a second system in the system cluster, wherein the third instance of the application is present on a third system of the system cluster, and wherein the third instance of the application is running on the third system of the system cluster while the first instance of the application is running on the first system and continues running on the third system after shutting down the first instance of the application responsive to the second instance of the application completing a start up of the second instance of the application.

* * * * *